(12) United States Patent
Altenberend et al.

(10) Patent No.: US 11,267,284 B2
(45) Date of Patent: Mar. 8, 2022

(54) GRIT-DISPENSING DEVICE FOR RAIL VEHICLES

(71) Applicant: Hanning & Kahl GmbH & Co. KG, Oerlinghausen (DE)

(72) Inventors: Martin Altenberend, Oerlinghausen (DE); Marcel Voigt, Oerlinghausen (DE)

(73) Assignee: Hanning & Kahl GmbH & Co. KG, Oerlinghausen (DE)

( * ) Notice: Subject to any disclaimer, the term of this patent is extended or adjusted under 35 U.S.C. 154(b) by 241 days.

(21) Appl. No.: 16/648,504

(22) PCT Filed: Dec. 17, 2018

(86) PCT No.: PCT/EP2018/085304
§ 371 (c)(1),
(2) Date: Mar. 18, 2020

(87) PCT Pub. No.: WO2019/121563
PCT Pub. Date: Jun. 27, 2019

(65) Prior Publication Data
US 2020/0215853 A1 Jul. 9, 2020

(30) Foreign Application Priority Data
Dec. 20, 2017 (DE) .......................... 202017107772.1

(51) Int. Cl.
*B60B 39/08* (2006.01)
*B61C 15/10* (2006.01)
(52) U.S. Cl.
CPC .......... *B60B 39/086* (2013.01); *B61C 15/102* (2013.01)

(58) Field of Classification Search
CPC ..... B60B 39/086; B60B 39/021; B60B 39/02; B60B 39/10; B60B 39/025; B60B 39/023; B60B 39/08; B61C 15/102; B61C 15/107
See application file for complete search history.

(56) References Cited

U.S. PATENT DOCUMENTS

2011/0187128 A1* 8/2011 Bartling ................. B60B 39/10
291/23
2012/0158223 A1* 6/2012 Liberatore ............ B61C 15/107
701/19

(Continued)

FOREIGN PATENT DOCUMENTS

DE        2938583 A1    4/1981
DE   102004014360 A1   10/2005
(Continued)

*Primary Examiner* — Mark T Le
(74) *Attorney, Agent, or Firm* — Richard M. Goldberg

(57) ABSTRACT

A grit dispensing device for rail vehicles, having a grit tank; a compressed air source connected to a dispensing line for the grit via a pressure line and a nozzle; an intake channel via which grit can be conveyed from the grit tank into the dispensing line; a bypass which leads from the pressure line to a point in the dispensing line downstream of the mouth of the intake channel so as to bypass the nozzle and the passage cross-section of which can be controlled by a valve; and an electronic control device for the valve, the control device being designed to open and close the valve in intervals with a frequency adapted to the length of the dispensing line in such a way that grit charges which are ejected in the individual open periods of the valve consolidate in the dispensing line to form a steady grit flow.

11 Claims, 4 Drawing Sheets

(56) References Cited

U.S. PATENT DOCUMENTS

2013/0206862 A1\* 8/2013 Worden ................ B61C 15/107
 239/99
2014/0183879 A1\* 7/2014 Piroozmandi ........... B60B 39/02
 291/1

FOREIGN PATENT DOCUMENTS

| DE | 202014102881 U1 | 7/2014 |
| EP | 2311653 A1 | 4/2011 |
| WO | 2008064747 A1 | 6/2008 |

\* cited by examiner

GRIT-DISPENSING DEVICE FOR RAIL VEHICLES

BACKGROUND OF THE INVENTION

The invention relates to a grit dispensing device for rail vehicles, having a grit tank; a compressed air source which is connected to a dispensing line for the grit via a pressure line and a nozzle; an intake channel via which the grit can be conveyed from the grit tank into the dispensing line; a bypass which leads from the pressure line to a point in the dispensing line downstream of the mouth of the intake channel so as to bypass the nozzle and the passage cross-section of which can be controlled by a valve; and an electronic control device for the valve.

Devices of this type are used on rail vehicles for dispersing sand or some other grit on the running surface of the rail head immediately in front of a contact point of a wheal of the rail vehicle, thereby to increase the friction between the wheel and the rail and to archive a better traction during run-up and a shorter breaking distance when the vehicle is braked. The grit should be dispensed on the rail as evenly as possible in order to ensure stable run-up and braking conditions.

An example of a grit dispensing device of the type described above has been disclosed in EP 2 311 653 B1. By means of the nozzle, the compressed air is ejected into the dispensing line at elevated speed, so that the grit is sucked-in via the intake channel through jet pump action and is then conveyed through the dispensing line together with the compressed air. When the valve in the bypass is opened, the volume flow rate and the flow velocity of the air passing through the nozzle decrease, so that less grit is sucked-in. By suitably adjusting the open cross-section of the valve, it is possible to dose the amount of grit that is being dispensed. In the known device, the bypass has a relatively large cross-section in relation to the cross-section of the nozzle, so that, when the valve is totally opened, the volume flow rate through the nozzle is reduced to almost zero. The compressed air that will then flow into the dispensing line via the bypass can be utilized for clearing the dispensing line. In this way, clogging of the dispensing line can be prevented by switching to the operation mode with fully opened valve in certain intervals.

SUMMARY OF THE INVENTION

It is an object of the invention to provide a grit dispensing device which permits a simpler and more exact dosing of the grit.

According to the invention, in order to achieve this object, the control device is designed to open and close the valve in intervals with a frequency that is adapted to the length of the dispensing line in such a way that the grit charges which are ejected in the individual open periods of the valve consolidate in the dispensing line to form a steady grit flow.

In the device according to the invention, the time-average of the amount of grit that is being dispensed is determined by the ratio between the length of the closed periods and the length of the open periods of the valve. The shorter the closed period of the valve, the shorter are the intervals in which the compressed air flows through the nozzle with high volume flow rate and high velocity and in which the grit is effectively taken in. Thus, no proportional valve is needed for dosing the amount of grit, instead it is possible to employ a valve that has a simpler design and can be switched only between a fully open position and a fully closed position.

The control of this valve may for example be achieved by means of a pulse signal that is generated by the control device and the duty cycle of which determines the average amount of grit.

However, since the nozzle is active only in intervals in this device, the grit is not taken in uniformly, but in separate, time-successive charges which correspond to the closed periods of the valve. If, however, the frequency of the control signal is sufficiently high, the individual charges follow one upon the other in so short intervals that a dispersion of the grit takes place on the way through the dispensing line, due to speed differences of the individual grit particles, so that the charges consolidate towards to the exit of the dispensing line to form a steady grit flow and, consequently, the grit can be dispensed essentially uniformly in spite of the discontinuous operation of the valve.

Useful details and further developments of the invention are indicated in the dependent claims.

In an advantageous embodiment, the valve that may be operated electro-magnetically, for example, is configured as a two-position flap valve which obstructs the access to the bypass and keeps the flow path towards the nozzle open in one position and keeps the access to the bypass open and obstructs the flow path towards the nozzle in the other position. In the position in which the flow path towards the nozzle is blocked, no grit is taken in, so that this operating condition can also be used for blowing the dispensing line free of grit.

In another useful embodiment, the bypass has two parallel passages only one of which is controlled by the valve that is operated in intervals. The other passage may be held open constantly or may be throttled by means of a manually adjustable or electronically controlled valve that has only a slow response, so that the certain amount of air is continuously supplied into the dispensing line via this bypass passage in order to prevent a clogging of the dispensing line. At the same time, a larger range of variation in the default setting of the maximum grit flow rate may be achieved by the cooperation of the valve that is operated in intervals with the valve that is adjusted to a fixed position or responds only slowly.

The pressure line, the nozzle, the bypass and at least an upstream part of the dispensing line may conveniently be integrated into a dispensing unit which can be attached to the grit tank such that it forms a part of the bottom of the grit tank. Then, the valve and the related operating unit may also be integrated into the dispensing unit and may for example be arranged such that they are accommodated inside of the grit tank. Then, the supply of the control signal to the valve is preferably achieved via a connector that is located in the part of the dispensing unit that is accessible from outside.

BRIEF DESCRIPTION OF THE DRAWINGS

An embodiment example will now be described in conjunction with the drawings, wherein.

DETAILED DESCRIPTION

Figure 1:
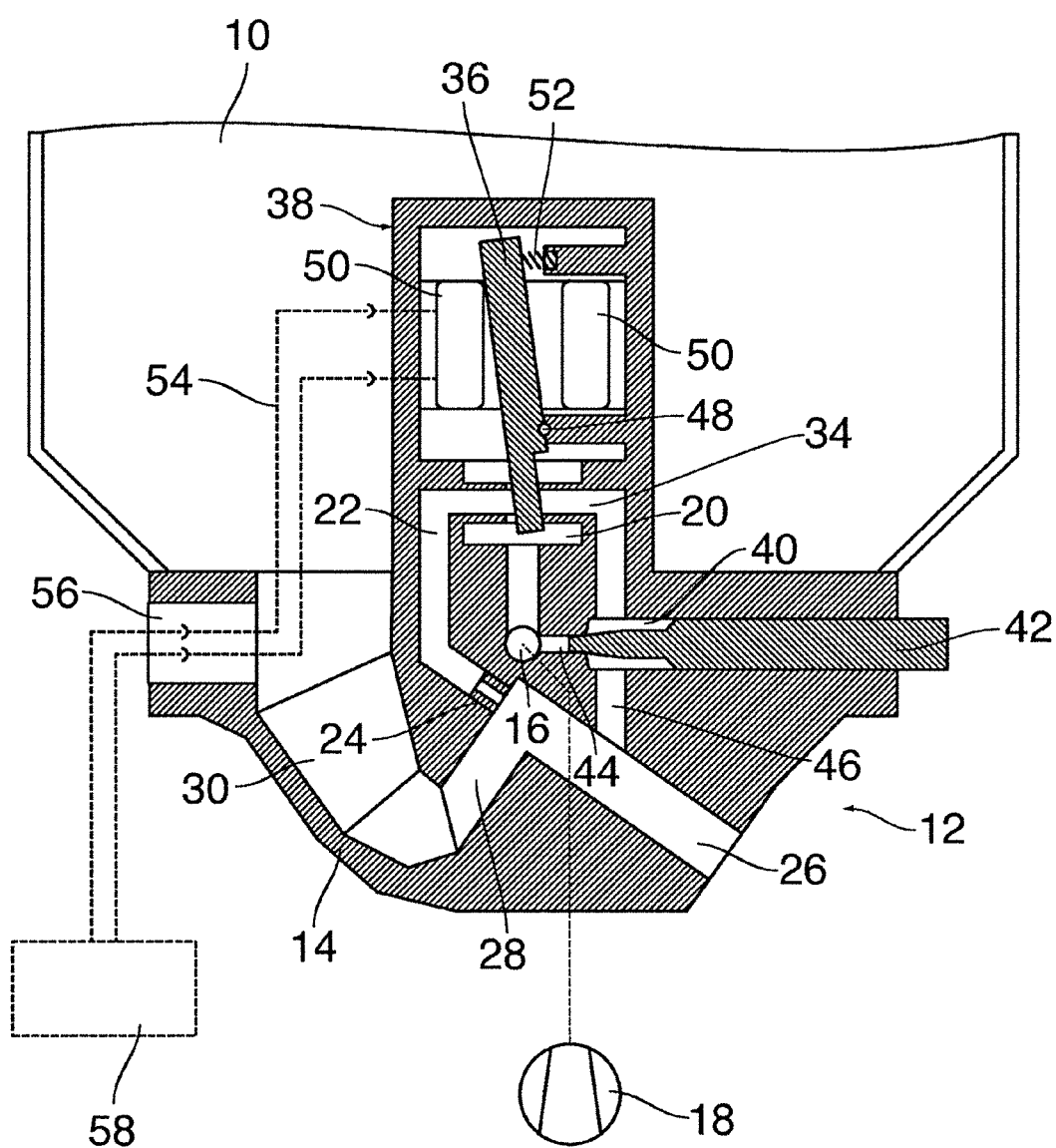
FIG. 1 is a schematic cross-sectional view of a grit dispensing device according to the invention.

The grit dispensing device that has been shown in FIG. 1 comprises a grit tank 10 which is funnel-shaped in its lower part and the bottom of which in the lowest position is constituted by a dispensing unit 12 that has been detachably flanged to the tank. A supply line 16 which extends normal to the plane of the drawing in FIG. 1 and is connected to a compressed air source 18 that has been shown only schematically here is formed in a body 14 of the dispensing unit 12. The supply line 16 is connected, via a valve chamber 20, to a pressure line 22 from which the compressed air is jetted coaxially into a dispensing line 26 via a nozzle 24. In the example shown, the downstream part of the pressure line 22, the nozzle 24 and the dispensing line 26 are inclined relative to the vertical when the dispensing unit is mounted on the grit tank 10. For example, the axis of the dispensing line may form an angle of slightly more than 45° with the vertical. The top end of the dispensing line 26, i.e. the end that is adjacent to the nozzle 24, is connected to an intake channel 28 which extends orthogonally from the dispensing line 26 and thus rises towards the dispensing line at an angle of slightly less than 45°. The lower end of the intake channel 28 is connected to the interior of the grit tank 10 via a manifold 30 that is formed in the body 14.

Thus, the grit from the grit tank 10 will trickle into the manifold 30 under the action of gravity. However, the height difference between lowest position of the manifold and the top end of the intake channel 28 is so large that the grit will not spill over into the dispensing line 26 solely under the action of gravity. Only when compressed air is jetted into the intake line 26 via the nozzle 24, an underpressure builds up in the top end of the dispensing line 26 which has been formed simply by a cylindrical bore in the body 14 in this example, so that the grit will be sucked-in under jet pump action and will then be conveyed through the dispensing line 26 towards an exit end thereof together with the compressed air.

Figure 3:
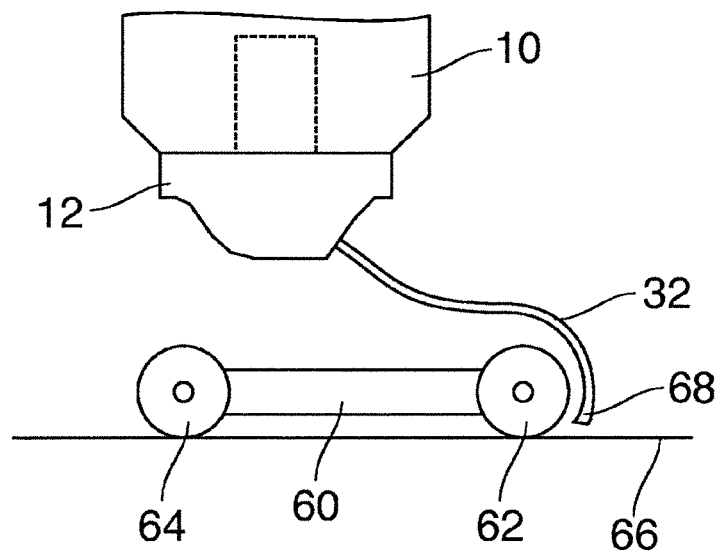
FIG. 3 is a schematic sketch of the grit dispensing device at a wheel assembly of a rail vehicle.

As has been shown in FIG. 3, the dispensing line 26 is extended outside of the body 14 by a line 32 that is formed by a pipe or tube that also forms part of the dispensing line.

The valve chamber 20 shown in FIG. 1 forms part of a circuit system that extends vertitally upwards from the supply line 16 along the axis of the body 14 and branches into the pressure line 22 and a first bypass passage 34 at a position above the valve chamber 20. An intake port of the bypass passage is opposed to the intake port of the pressure line 22. Both intake ports form valve seats for a valve member 36 of an electromagnetically operated valve 38 that is accommodated in a part of the body 14 that is located inside of the grit tank 10.

The first bypass channel 34 leads to a valve chamber of a manually operable adjusting valve 42. A second bypass channel leads directly from the supply line 16 to the valve chamber 40, and a third bypass channel 46 connects the valve chamber 40 to a point of the dispensing line 26 downstream of the mouth of the intake channel 28.

The adjusting valve 42 is configured as a needle valve by which the cross-section of the passage from the first bypass channel 44 to the valve chamber 40 can be adjusted continuously. The more the adjusting valve 42 is opened, the larger will be the fraction of the compressed air that flows via the second bypass channel 44 and the third bypass channel 46 directly into the dispensing line 26 without causing an intake of grit and serves only for keeping the dispensing line 26 and the connected line 32 free of grit residues and other contaminants.

The valve member 36 of the valve 38 is pivotable about an axis 48, that is fixed relative to the body 14 and has a lower part that projects into the valve chamber 20 through the interspace between the valve seats formed by the intake ports of the pressure line 22 and the first bypass passage 34. In the condition shown in FIG. 1, the valve member 36 engages the valve seat that is formed at the intake port of the first bypass passage 34, so that the first bypass passage is blocked. Thus, in this condition, the entire compressed air that cannot bleed via the second bypass passage 44 flows via the pressure line 22 and the nozzle 24 into the dispensing line 26 where it causes the grit to be sucked-in and dispensed.

The part of the valve member 36 located above the axis 48 forms a magnet armature that is positioned in a coil 50 of an electromagnetic operating unit and is elastically biased into the position shown in FIG. 1 by a spring 52. When a current is applied to the coil 50 via electric leads 54, the coil draws the valve member 36 into the opposite extreme position that has been shown in FIG. 2 and in which the valve member engages the valve seat that is formed by the intake port of the pressure line 22. Thus, in this condition, the entry into the pressure line 22 is blocked, so that the entire compressed air flows off via the bypass passages 34 and 44 and further via the third bypass passage 46. Thus, in this condition, the dispense of grit is completely inhibited.

Inside of the body 14, the electric leads 54 lead to a connector 56 that has been formed in this body and to which an electronic control device 58 for the valve 38 is connected. The connector 56 is disposed on a part of the body 14 that is located below the grit tank 10 and is readily accessible.

Figure 2:
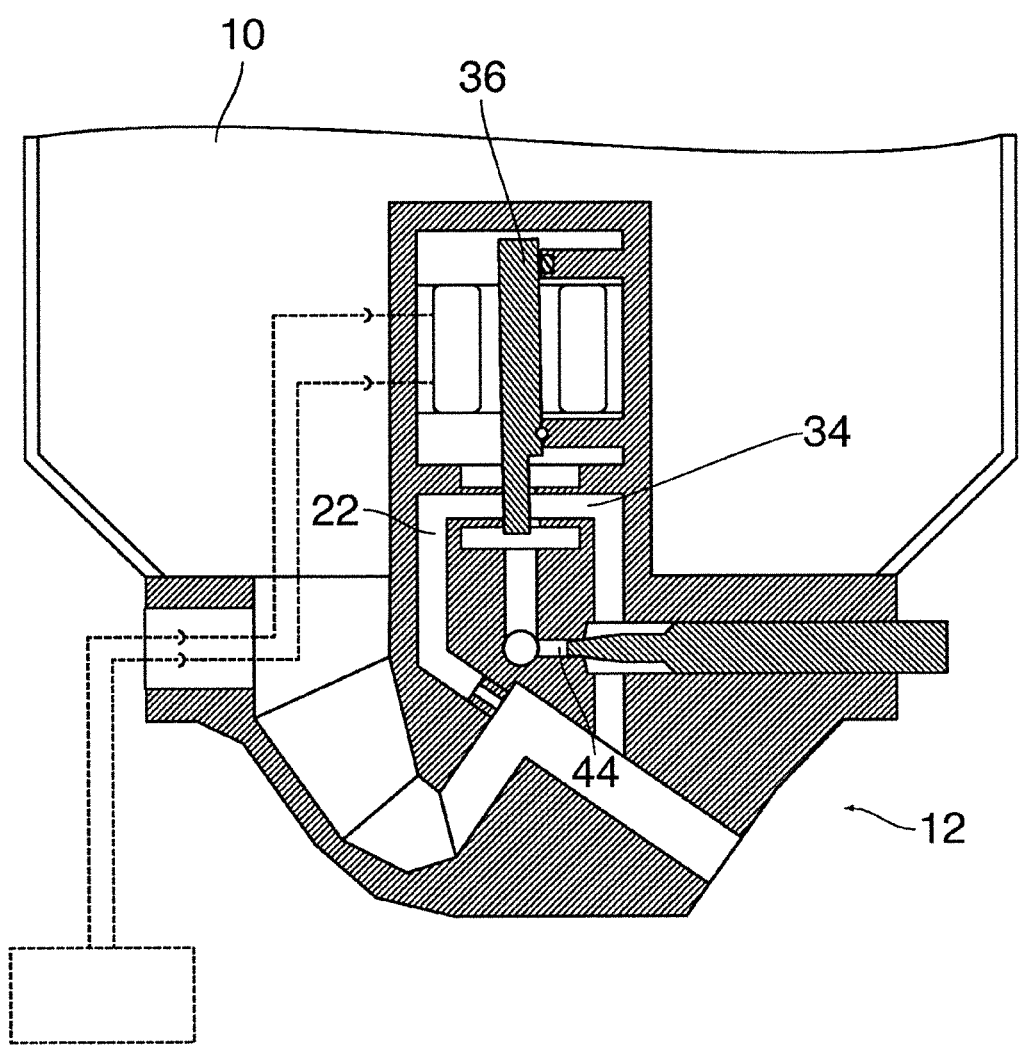
FIG. 2 shows central parts of the device shown in FIG. 1 in another operating condition.

When the grit dispensing device is operating, the control device 58 delivers a square-shaped pulse signal to the coil 50, so that the valve member 36 is alternately switched between the positions shown in FIGS. 1 and 2. The switching frequency may for example be in the order of magnitude of 3 to 20 Hz and depends upon the length of the dispensing line 26 including the line 32.

FIG. 3 shows schematically a bogie 60 of a rail vehicle as well as front wheels 62 and rear wheels 64 of this bogie and a portion of a rail 66 on which the wheels 62, 64 roll. The line 32 that leads from the grid-dispensing device terminates in a nozzle 68 directly ahead of the points of contact of the front wheels 62. By means of a bracket that has not been shown, the grit tank 10 and the dispensing unit 12 are fixedly attached to the bogie or, optionally, to the vehicle body. In the latter case, the line 32 should be flexible.

Figure 4:
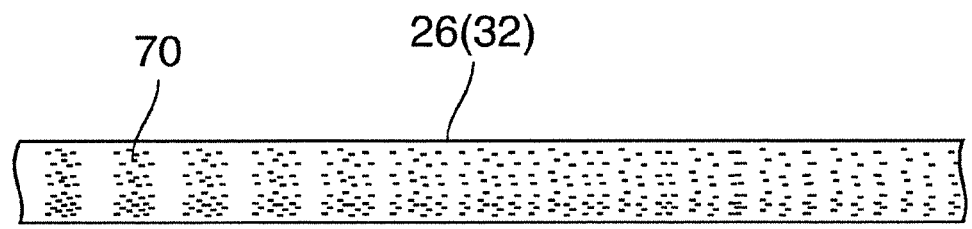
FIG. 4 is a schematic longitudinal section of a portion of the dispensing line through which the grit is being conveyed.

FIG. 4 schematically shows a longitudinal section of a portion of the dispensing line 26 and the line 32 extending the same. Due to the alternating action of the valve 38, the grit is dispensed in charges 70, each charge being created within a time interval in which the valve is in the condition shown in FIG. 1. The compressed air and the charges 70 of the grit flow from left to right in FIG. 4. In the upstream region of the dispensing line, the charges 70 are still markedly separated from one another. Since, however, not all grit particles have the same velocity, a gradual dispersion of the charges 70 occurs while they are conveyed through the dispensing line, so that these charges are increasingly expanded and merge with one another towards the downstream end of the dispensing line, as has been shown on the right side in FIG. 4. In this way, a steady flow of grit with practically constant grit flow rate is achieved at the nozzle 68. The larger the total length of the dispensing line 26 and the line 32, the smaller may be the switching frequency of the valve 38.

In any case, the time average of the amount of grit that is being dispensed per time unit is determined by the duty cycle of the pulse signal with which the coil 50 is controlled. Thus, the dispensed amount of grit may be adjusted as desired and precisely dosed by adjusting the duty cycle by means of the control device 58.

Although the valve 38 has a simple design and has only two switching states, a precise dosing can be achieved by pulse width modulation of the control signal, and, in addition, the amount of grit can rapidly be adapted to the present demand by changing the modulation.

In the design shown in FIG. 1, all movable parts of the device, in particular the valve member 36, are arranged such that they are effectively protected against the ingress of grit, so that they are not exposed to the abrasive action of the grit.

The duty ratio of the control signal may in principle be varied between 0 and 100%. At a duty ratio of 0%, the pressure line 22 is continuously open (FIG. 1). Then, the flow rate of the grit is determined by the setting of the adjusting valve 42. At a duty cycle of 100%, no grit is dispensed, not even when the compressed air source 18 continues to be active. In this state, the dispensing line 26 and the line 32 can effectively be cleared by means of the entire amount of compressed air that is available.

In general, the duty ratio will be varied as dependent upon the speed of the vehicle, such that equal amounts of grit are dispensed per meter that the vehicle has travelled. If, however, the compressor serving as compressed air source 18 is powered from a power source the voltage of which is subject to significant fluctuations, then the duty ratio may also be varied as dependent upon the operating voltage of the compressor in order to compensate for changes in the performance of the compressor.

Figure 5:
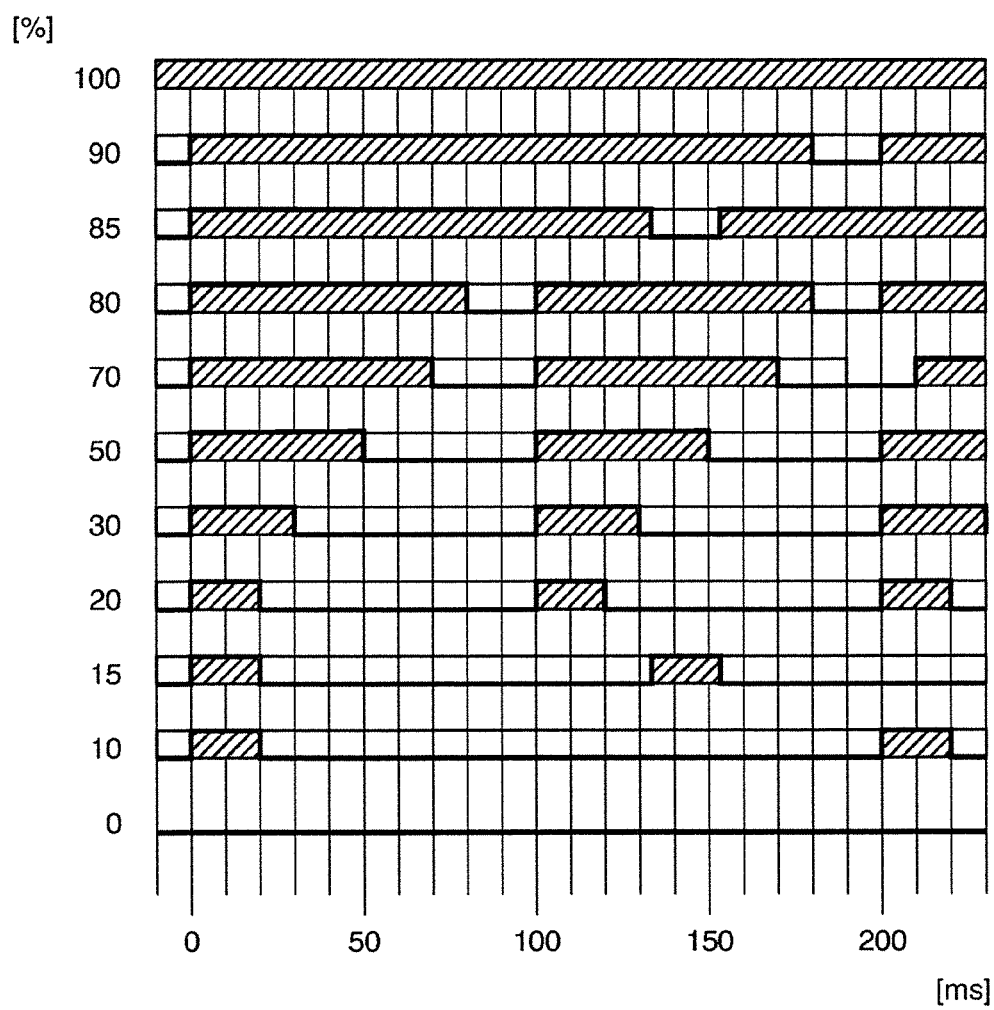
FIG. 5 is a time diagram illustrating different control signal waveforms.

Since, in practice, the valve 38 will have a certain response delay, duty ratios close to 0% and duty ratios close to 100% may possibly not be achievable with the desired accuracy as long as the switching frequency of the control signal is fixed. It is therefore convenient to prescribe a certain minimum duration of the duty pulses and also a certain minimum duration of the pulse gaps of the pulse width modulated (PDM) control signal and, when this minimum duration is underrun, to adapt the duty ratio by reducing the frequency of the PDM signal. An example of such a pulse width modulation scheme has been shown in FIG. 5. The time in milliseconds has been shown on the horizontal axis, and different signal waveforms have been shown for duty ratios between 0 and 100%. At a duty ratio close to 50%, the PDM signal has a frequency of 10 Hz and, accordingly, a period of 100 ms. At a duty ratio of exactly 50%, thus, the duty pulses have a duration of 50 ms, and the pulse gaps have also a duration of 50 ms. A duty ratio of 30% can be realized without changing the frequency by reducing the pulse duration to 30 ms. Similarly, the duty ratio of 20% can be realized by reducing the pulse duration to 20 ms. In the example shown, this value of 20 ms is the minimum pulse duration for the duty pulse. In order to achieve a duty ratio of 50%, the duty pulse duration is left unchanged at 20 ms, and the frequency is reduced instead, so that the period of the PDM signal increases to 133 ms. Similarly, a duty ratio of 10% is achieved with a modulation period of 200 ms and a duty pulse duration of 20 ms.

At duty ratios above 80%, the duration of the pulse gaps is kept at the minimum value of 20 ms. Then, a duty ratio of 85 or 90% can be realized by increasing the modulation period to 133 ms and 200 ms, respectively.

Further, it is convenient to prescribe a lower limit for the frequency of the PDM signal. If the frequency drops below this limit, the coil 50 is either never energized (duty ratio 0%) or always energized (duty ratio 100%).

What is claimed is:

1. A grit dispensing device for rail vehicles, comprising:
 a grit tank for holding grit;
 a dispensing line for the grit;
 a pressure line;
 a nozzle connected between the pressure line and the dispensing line;
 with a compressed air source adapted to be connected to the dispensing line for the grit via the pressure line and the nozzle,
 an intake channel via which the grit can be conveyed from the grit tank into the dispensing line;
 a bypass passage which leads from the pressure line to a point in the dispensing line downstream of a mouth of the intake channel so as to bypass the nozzle and having a passage cross-section;
 a valve for controlling the passage cross-section of the bypass passage; and
 an electronic control device for the valve, which is designed to open and close the valve in intervals with a frequency that is adapted to a length of the dispensing line in such a way that grit charges are ejected in individual open periods of the valve and consolidate in the dispensing line to form a steady grit flow.

2. The device according to claim 1, wherein the valve is a magnetically operated valve with two switch positions.

3. The device according to claim 2, wherein the valve is a flap valve that keeps the pressure line open and blocks the bypass passage in one position and blocks the pressure line and keeps the bypass passage open in the other position.

4. The device according to claim 1, wherein the bypass passage comprises two bypass passages only one of which is adapted to be opened and closed by the valve that is operated in alternating intervals.

5. The device according to claim 4, further comprising another valve adapted to change the passage of at least one of the bypass passages independently of the state of the valve that is operated in alternating intervals.

6. The device according to claim 4, wherein the two bypass passages are connected to the dispensing line via a common third bypass passage.

7. The device according to claim 1, wherein the pressure line, the nozzle, at least a part of the dispensing line, and the intake channel are formed in a body that forms part of a bottom of the grit tank, and wherein the valve is disposed on the body and inside of the grit tank.

8. The device according to claim 7, further comprising electric leads for the valve which extend inside of the body to a connector that is located at an accessible position outside of the grit tank and adapted to be connected to the control device.

9. The device according to claim 1, the preceding claims, wherein the control device is configured to vary a duty ratio with which the valve is opened and closed in accordance with demand.

10. The device according to claim 9, wherein the control device is configured for varying the duty ratio as dependent upon a travel speed of the rail vehicle and as dependent upon a performance of the compressed air source.

11. The device according to claim 9, wherein the control device is configured for operating the valve with a pulse width modulation signal having a variable frequency, wherein a duration of duty pulses of the pulse width modulation signal as well as a duration of pulse gaps between these duty pulses do not drop below a certain minimum duration and duty ratios close to 0% as well as duty ratios close to 100% are realized by varying the frequency of the pulse width modulation signal within a predetermined range of variation at fixed duration of the duty pulses and the pulse gaps.

* * * * *